(12) United States Patent
Ishii et al.

(10) Patent No.: US 10,913,420 B2
(45) Date of Patent: Feb. 9, 2021

(54) STEERING WHEEL

(71) Applicant: TOYODA GOSEI CO., LTD., Kiyosu (JP)

(72) Inventors: Tsutomu Ishii, Kiyosu (JP); Toshihito Yanagisawa, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 113 days.

(21) Appl. No.: 16/131,195

(22) Filed: Sep. 14, 2018

(65) Prior Publication Data

US 2019/0092263 A1 Mar. 28, 2019

(30) Foreign Application Priority Data

Sep. 28, 2017 (JP) ................ 2017-188211

(51) Int. Cl.
*B60R 21/203* (2006.01)

(52) U.S. Cl.
CPC ........ *B60R 21/203* (2013.01); *B60R 21/2037* (2013.01)

(58) Field of Classification Search
CPC ... B60R 21/203; B60R 21/2037; B62D 7/222; B60Q 5/003
See application file for complete search history.

(56) References Cited

U.S. PATENT DOCUMENTS

| | | | | |
|---|---|---|---|---|
| 2,669,370 A | * | 2/1954 | Royall, Jr. ............. | B65D 39/04 215/355 |
| 2,734,649 A | * | 2/1956 | Callahan et al. .. | B65D 55/0863 215/233 |
| 3,350,042 A | * | 10/1967 | Stewart ................. | F16F 1/3732 267/141.4 |
| 3,566,859 A | * | 3/1971 | Schwartz ........... | A61B 5/15003 600/578 |

(Continued)

FOREIGN PATENT DOCUMENTS

| JP | S52-042303 | 3/1977 |
|---|---|---|
| JP | S52-042303 A | 3/1977 |

(Continued)

OTHER PUBLICATIONS

Office Action dated Aug. 18, 2020 in corresponding JP patent application No. 2017-188211 (and an English translation).

*Primary Examiner* — Paul N Dickson
*Assistant Examiner* — Timothy Wilhelm
(74) *Attorney, Agent, or Firm* — Posz Law Group, PLC

(57) ABSTRACT

A steering wheel includes: a support member which is inserted into a bag holder of an airbag device; a slider which has a cylindrical shape and covers the support member so as to be slidable in a front-rear direction; a damper holder which has an annular shape and covers at least a part of a region around the slider; an elastic member which has an annular shape and is interposed between the slider and the damper holder, in which the airbag device functions as a damper mass of a dynamic damper and the elastic member (Continued)

functions as a spring of the dynamic damper; and a friction damping unit including: a part provided in a portion between the slider and the elastic member; and a part provided in a portion between the damper holder and the elastic member.

3 Claims, 9 Drawing Sheets

(56) References Cited

U.S. PATENT DOCUMENTS

| | | | | |
|---|---|---|---|---|
| 4,089,432 | A * | 5/1978 | Crankshaw | B65D 25/082 |
| | | | | 215/6 |
| 5,180,643 | A * | 1/1993 | Nedbal | G01F 23/2922 |
| | | | | 215/355 |
| 5,328,203 | A * | 7/1994 | Baba | B60R 21/276 |
| | | | | 280/728.2 |
| 5,410,114 | A * | 4/1995 | Furuie | B60Q 5/003 |
| | | | | 200/61.55 |
| 5,544,871 | A * | 8/1996 | Reinemuth | B60R 21/2037 |
| | | | | 248/635 |
| 6,600,114 | B2 * | 7/2003 | Kikuta | B60Q 5/003 |
| | | | | 200/61.54 |
| 6,719,160 | B2 * | 4/2004 | Sen-Yih | B65D 39/12 |
| | | | | 215/361 |
| 6,722,227 | B2 * | 4/2004 | Rabagliano | B60Q 5/003 |
| | | | | 200/61.54 |
| 6,995,328 | B2 * | 2/2006 | Sugimoto | B60Q 5/003 |
| | | | | 200/61.54 |
| 7,048,720 | B1 * | 5/2006 | Thorne, Jr. | A61M 5/284 |
| | | | | 604/191 |
| 8,342,567 | B2 * | 1/2013 | Sasaki | B60R 21/2037 |
| | | | | 200/61.55 |
| 8,556,292 | B2 * | 10/2013 | Umemura | B62D 7/222 |
| | | | | 280/731 |
| 8,720,942 | B2 * | 5/2014 | Onohara | B60R 21/2037 |
| | | | | 200/61.55 |
| 8,794,662 | B2 * | 8/2014 | Ishii | B60R 21/2037 |
| | | | | 280/731 |
| 9,085,278 | B2 * | 7/2015 | Kiuchi | B60R 21/2037 |
| 9,156,400 | B2 * | 10/2015 | Ishii | B60Q 5/003 |
| 9,195,257 | B2 * | 11/2015 | Miyahara | B60R 21/2037 |
| 9,226,876 | B2 * | 1/2016 | Kerns | A61J 11/004 |
| 9,550,525 | B2 * | 1/2017 | Ishii | B60Q 5/003 |
| 9,905,337 | B2 * | 2/2018 | Komori | H01B 7/282 |
| 10,315,605 | B2 * | 6/2019 | Ishii | B60R 21/2037 |
| 10,351,089 | B2 * | 7/2019 | Ishii | B60R 21/2037 |
| 10,377,335 | B2 * | 8/2019 | Ishii | B60R 21/2035 |
| 10,406,975 | B2 * | 9/2019 | Obayashi | B62D 7/222 |
| 2004/0232101 | A1 * | 11/2004 | Gardner | B65D 1/0246 |
| | | | | 215/277 |
| 2009/0218739 | A1 * | 9/2009 | Terada | B60R 21/2037 |
| | | | | 267/2 |
| 2010/0219621 | A1 * | 9/2010 | Sasaki | B60Q 5/003 |
| | | | | 280/731 |
| 2011/0120258 | A1 * | 5/2011 | Kondo | B60Q 5/003 |
| | | | | 74/552 |
| 2013/0008282 | A1 * | 1/2013 | Johnson | B62M 9/12 |
| | | | | 74/594.2 |
| 2013/0076011 | A1 * | 3/2013 | Umemura | B62D 7/222 |
| | | | | 280/728.2 |
| 2013/0105219 | A1 * | 5/2013 | Osawa | H01R 13/5208 |
| | | | | 174/77 R |
| 2014/0131982 | A1 * | 5/2014 | Ishii | B60R 21/2037 |
| | | | | 280/728.2 |
| 2016/0031480 | A1 * | 2/2016 | Ishii | B60Q 5/003 |
| | | | | 280/731 |
| 2017/0361801 | A1 * | 12/2017 | Banno | B60Q 5/003 |

FOREIGN PATENT DOCUMENTS

| | | |
|---|---|---|
| JP | H06-234883 A | 8/1994 |
| JP | 2008-000194 A | 1/2008 |
| JP | 2013-154824 A | 8/2013 |
| JP | 2014-111426 A | 6/2014 |
| JP | 2017-024592 A | 2/2017 |

* cited by examiner

STEERING WHEEL

CROSS-REFERENCE TO RELATED APPLICATION(S)

This application is based upon and claims the benefit of priority from Japanese Patent Application No. 2017-188211, filed on Sep. 28, 2017, the entire contents of which are incorporated herein by reference.

BACKGROUND

1. Field of the Invention

The present invention relates to a steering wheel which is rotated when a traveling direction or a backward direction is changed in a vehicle such as a car.

2. Description of the Related Art

As one form of a steering wheel, there is a steering wheel which is provided with an airbag device for protecting a driver from an impact when the impact is applied to a vehicle such as a car from the front (for example, see JP-A-2017-24592). As illustrated in FIG. 10, the steering wheel 10 includes a support member 31, a slider 32, a damper holder 42, and an elastic member 41. The support member 31 is supported by a core metal 12 of the steering wheel 10 in a state where the support member 31 passes through a bag holder 21 of an airbag device 20. The slider 32 has a tubular shape and is disposed on the support member 31 so as to be slidable in a front-rear direction which is a direction along an axis thereof. The damper holder 42 has an annular shape and covers at least a part of an area around the slider 32. The elastic member 41 has an annular shape and interposed between the slider 32 and the damper holder 42.

In the steering wheel 10 having the configuration described above, the airbag device functions as a damper mass of a dynamic damper and the elastic member 41 functions as a spring of the dynamic damper.

Therefore, when the steering wheel 10 vibrates in an up-down direction or a right-left direction, the elastic member 41 vibrates with the airbag device 20 while the elastic member 41 is elastically deformed at a resonance frequency equal to or close to a frequency of the vibration, and thus a vibration energy of the steering wheel 10 is absorbed. By the absorption, vibration of the steering wheel 10 is suppressed (damped).

When the elastic member 41 is elastically deformed in the up-down direction or the right-left direction, it also elastically deforms in a front-rear direction. For example, a gap G3 is formed on the front side of the elastic member 41 and a gap G1 is formed on the rear side of the elastic member 41. When the elastic member 41 is compressed in the up-down direction or the right-left direction, the elastic member 41 can be elastically deformed so as to bulge forward or backward by utilizing the gap G1 and the gap G3.

However, in the steering wheel 10 described in JP-A-2017-24592, the gap G1 is formed on the rear side of the elastic member 41, and thus the elastic member 41 and the damper holder 42 can be moved backward.

Generally, the elastic member 41 and the damper holder 42 are pressed forward by the weight of the airbag device 20, and thus the rearward movement thereof is suppressed. However, depending on a state of a road surface, when a car travels, a force exceeding the force of pressing them to the front side, the force being generated by the weight of the airbag device 20, is applied, and thus there is a possibility that the elastic member 41 and the damper holder 42 move backward.

When the elastic member 41 and the damper holder 42 move rearward, the contact surface between the pin holder 32 and the elastic member 41 is displaced. In addition, the elastic member 41 and the damper holder 42 are not in a fixed relationship with each other, and thus the contact surface between the elastic member 41 and the damper holder 42 can also be displaced. There is a concern that abnormal noise may be generated due to the displacement of the contact surface between the elastic member 41 and the damper holder 42 when the contact surface between the pin holder 32 and the elastic member 41 is displaced.

SUMMARY

The invention is made in view of such circumstances and an object thereof is to provide a steering wheel capable of improving an effect of suppressing abnormal noises.

According to a first aspect of the invention, there is provided a steering wheel including: a support member which is inserted into a bag holder of an airbag device; a slider which has a cylindrical shape and covers the support member so as to be slidable in a front-rear direction; a damper holder which has an annular shape and covers at least a part of a region around the slider; an elastic member which has an annular shape and is interposed between the slider and the damper holder, in which the airbag device functions as a damper mass of a dynamic damper and the elastic member functions as a spring of the dynamic damper; and a friction damping unit including: a part provided in a portion between the slider and the elastic member; and a part provided in a portion between the damper holder and the elastic member.

According to the first aspect, when the steering wheel vibrates, the airbag device functions as a damper mass of a dynamic damper, and the elastic body portion functions as a spring of the dynamic damper.

On the other hand, since the friction damping unit is provided between the damper holder and the elastic member, it is possible to reduce a frictional force generated in the contact surface between the slider and the elastic member and the contact surface between the damper holder and the elastic member and to smoothly move the damper holder and the elastic member backward when the elastic member and the contact surface between the damper holder moves backward.

Therefore, abnormal noises generated when the contact surface between the slider and the elastic member and the contact surface between the damper holder and the elastic member are displaced are suppressed.

According to a second aspect of the invention, in the steering wheel according to the first aspect, the friction damping unit may include ribs which extend in a circumferential direction and are set on an inner diameter side and an outer diameter side of the elastic member.

According to the second aspect, the area of the contact surface between the slider and the elastic member and the area of the contact surface between the damper holder and the elastic member are smaller than that of a contact surface of ordinary surface contact, and thus it is possible to reduce a frictional force generated in the contact surface between the slider and the elastic member and the contact surface between the damper holder and the elastic member. Therefore, abnormal noises generated when the contact surface between the slider and the elastic member and the contact surface between the damper holder and the elastic member are displaced are suppressed.

By setting the ribs extending in the circumferential direction on the inner diameter side and the outer diameter side of the elastic member, the ribs deform when the elastic member moves rearward, in such a manner that an energy which causes the elastic member to move backward is absorbed. Therefore, it is possible to suppress the amount of movement, and thus an effect of suppressing abnormal noises is further improved.

According to a third aspect of the invention, in the steering wheel according to the first aspect or the second aspect, the friction damping unit may include ribs which extend in a front-rear direction and are provided on an outer diameter side of the slider and an inner diameter side of the damper holder.

According to the third aspect, the area of the contact surface between the slider and the elastic member and the area of the contact surface between the damper holder and the elastic member are smaller than that of a contact surface of ordinary surface contact, and thus it is possible to reduce the frictional force generated in the contact surface between the slider and the elastic member and the contact surface between the damper holder and the elastic member. Therefore, abnormal noises generated when the contact surface between the slider and the elastic member and the contact surface between the damper holder and the elastic membrane displaced are suppressed.

According to a fourth aspect of the invention, in the steering wheel according to any one of the first to third aspects, the friction damping unit may include talc.

According to the fourth aspect, by interposing talc between the slider and the elastic member and between the damper holder and the elastic member, the frictional force generated in the contact surface between the slider and the elastic member and the contact surface between the damper holder and the elastic member can be reduced, and thus abnormal noises generated when the contact surface between the slider and the elastic member and the contact surface between the damper holder and the elastic member are displaced are suppressed.

According to the steering wheel, a frictional force generated in a contact surface between a slider and an elastic member and a contact surface between a damper holder and an elastic member can be reduced, and thus abnormal noises generated when the contact surface between the slider and the elastic member and the contact surface between the damper holder and the elastic member are displaced are suppressed.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 1A and 1B are views illustrating an embodiment embodied in a steering wheel for a car, in which FIG. 1A is a side view of the steering wheel and FIG. 1B is a front view illustrating a positional relationship of an airbag device in the steering wheel;

DETAILED DESCRIPTION OF THE INVENTION

Hereinafter, an embodiment embodied in a steering wheel for a car will be described with reference to FIGS. 1A to 9.

Figure 1A:
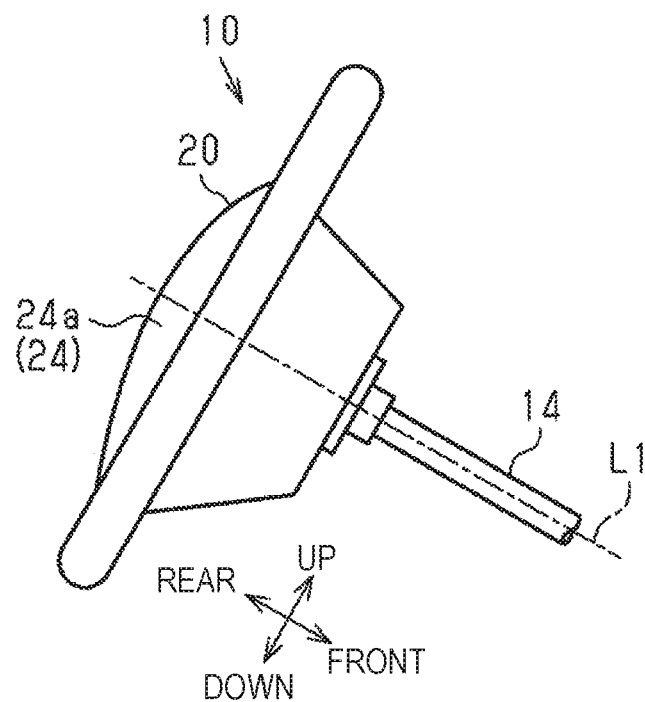

As illustrated in FIG. 1A, a steering shaft 14 which extends substantially in a front-rear direction of a car along an axis L1 and rotates around the axis L1 is disposed in the car such that the steering shaft is disposed in a state of being inclined so as to be higher toward the rear side. A steering wheel 10 is mounted on the rear end of the steering shaft 14.

In the embodiment, when each part of the steering wheel 10 is described, the axis L1 of the steering shaft 14 is used as a reference. A direction along the axis L1 is called a "front-rear direction" of the steering wheel 10 and an upright direction of the steering wheel 10 of a direction along a plane perpendicular to the axis L1 is referred to as an "up-down direction". Therefore, the front-rear direction and the up-down direction of the steering wheel 10 are slightly inclined with respect to the front-rear direction (horizontal direction) and the up-down direction (vertical direction) of the car.

Further, in FIGS. 2 to 9, for the sake of convenience, it is illustrated in a state where the front-rear direction of the steering wheel 10 is aligned in the horizontal direction and the up-down direction of the steering wheel 10 is aligned in the vertical direction. This also applies to FIG. 10 illustrating the technique of the related art.

Figure 1B:
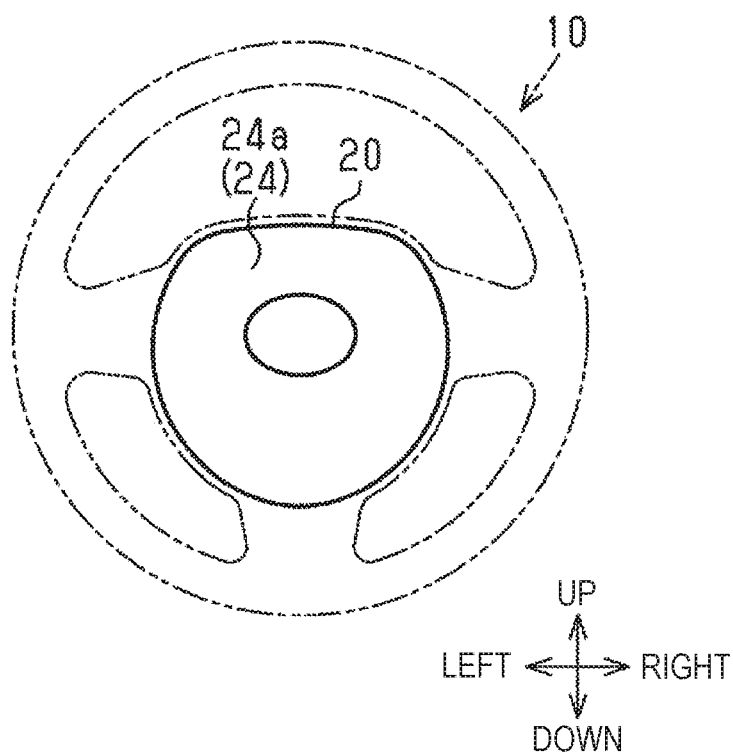
Figure 4:
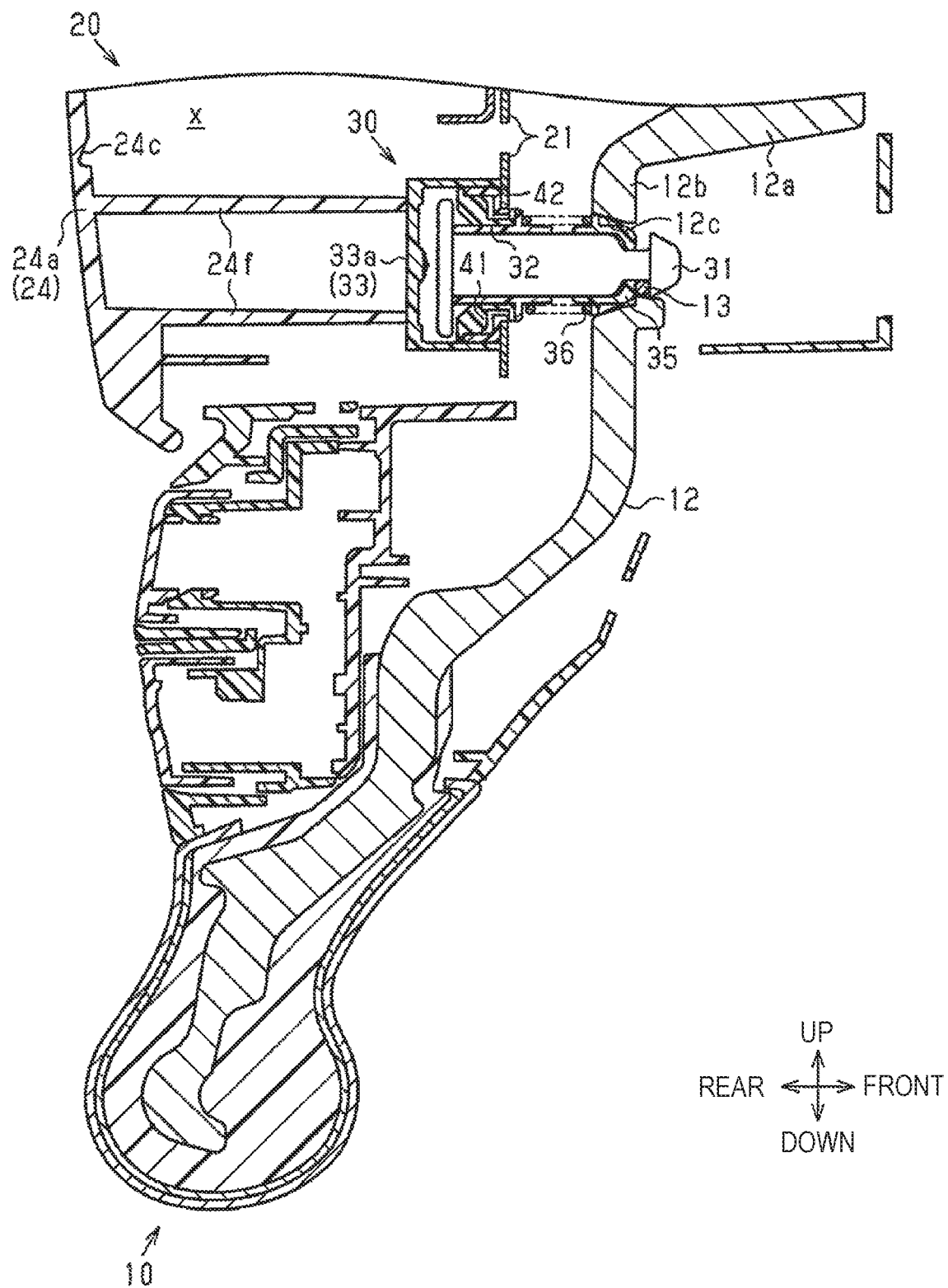
FIG. 4 is a partial longitudinal cross-sectional view of the steering wheel of the embodiment.

As illustrated in FIG. 1B, the steering wheel 10 is provided with an airbag device (airbag module) 20 in a central portion. As illustrated in FIG. 4, a skeleton portion of the steering wheel 10 is constituted of a core metal 12. The core metal 12 is made of iron, aluminum, magnesium, an alloy thereof, or the like. The core metal 12 is attached to the steering shaft 14 at a boss portion 12a positioned at the center portion thereof and rotates integrally with the steering shaft 14.

In the core metal 12, holding portions 12b each of which has a through hole 12c are provided at a plurality of positions around the boss portion 12a. The inner wall surface of each through hole 12c has a tapered shape which increases in diameter as the inner wall surface extends to the rear side.

Figure 7:
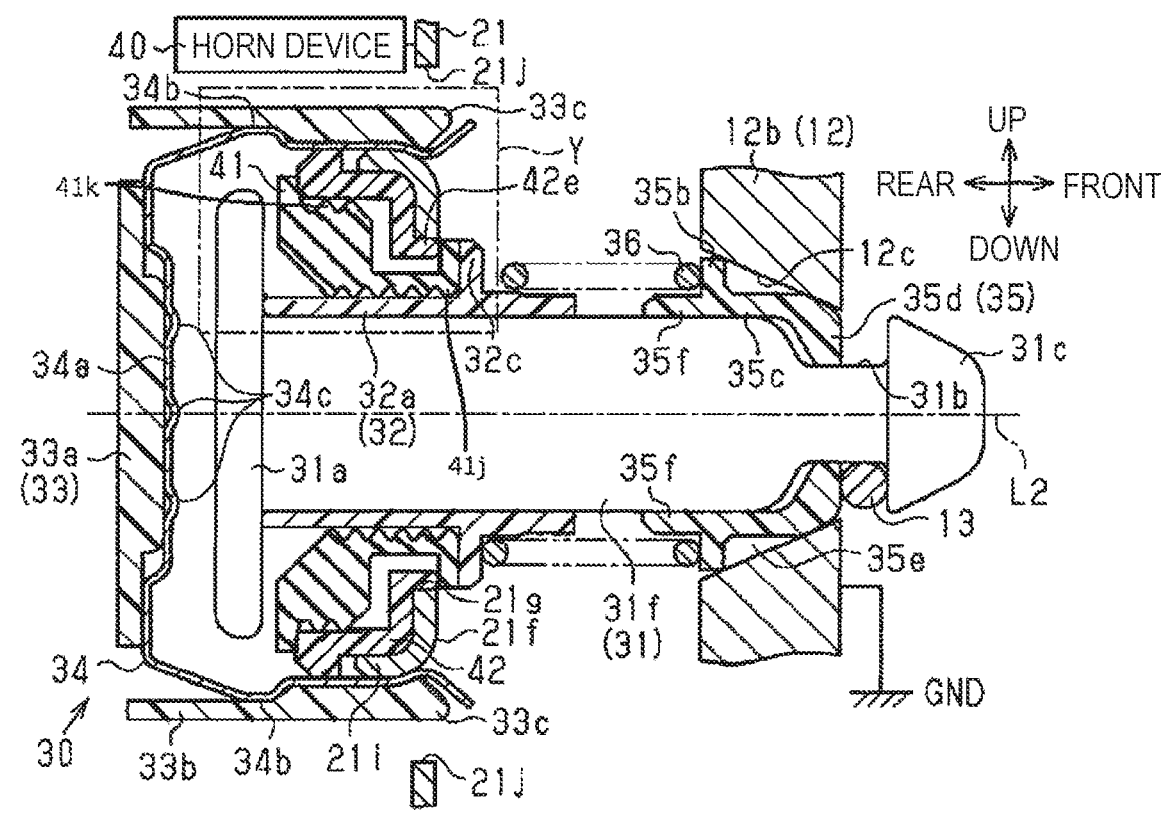
FIG. 7 is a partial longitudinal cross-sectional view illustrating a cross-sectional structure of the horn switch mechanism and a peripheral portion in the steering wheel of the embodiment.

As illustrated in FIG. 7, a clip 13 is disposed on the front side of each holding portion 12b. The clip 13 is formed by bending a wire made of a metal such as a spring cord having conductivity in a predetermined shape and a part of the clip 13 is in contact with the core metal 12. A part of each clip 13 is located in the vicinity of the front of the through hole 12c.

A car is provided with a horn device 40 and a plurality of horn switch mechanisms 30 (see FIGS. 2 and 5) for operating the horn device 40 are attached to the core metal 12 in a snap-fit structure in each holding portion 12b. Respective horn switch mechanisms 30 have the same configuration. The airbag device 20 is supported by the core metal 12 via those horn switch mechanisms 30. In this way, each horn switch mechanism 30 combines the function of supporting the airbag device 20 and the switching function of the horn device 40.

Furthermore, in the embodiment, an elastic member 41 and a damper holder 42 are interposed between a bag holder 21 of the airbag device 20 and respective horn switch mechanisms 30. A vibration damping structure for suppressing, that is, damping, the vibration of the steering wheel 10 is constituted of the core metal 12, the airbag device 20, the horn switch mechanism 30, the elastic member 41, the damper holder 42, and the like. Next, each part constituting the vibration damping structure described above will be described.

Airbag Device 20

Figure 3:
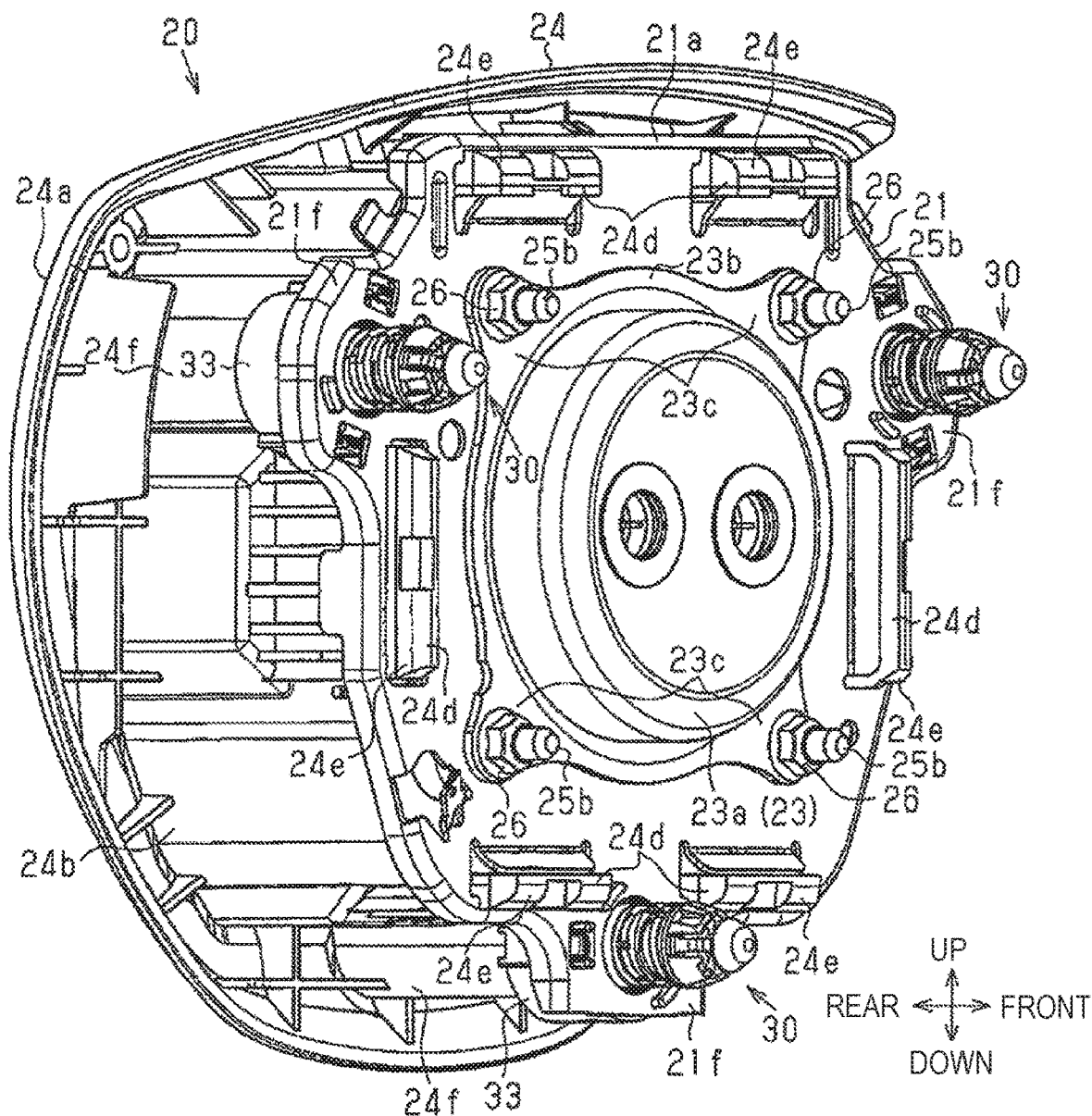
FIG. 3 is a perspective view of the airbag device in the steering wheel of the embodiment.
Figure 5:
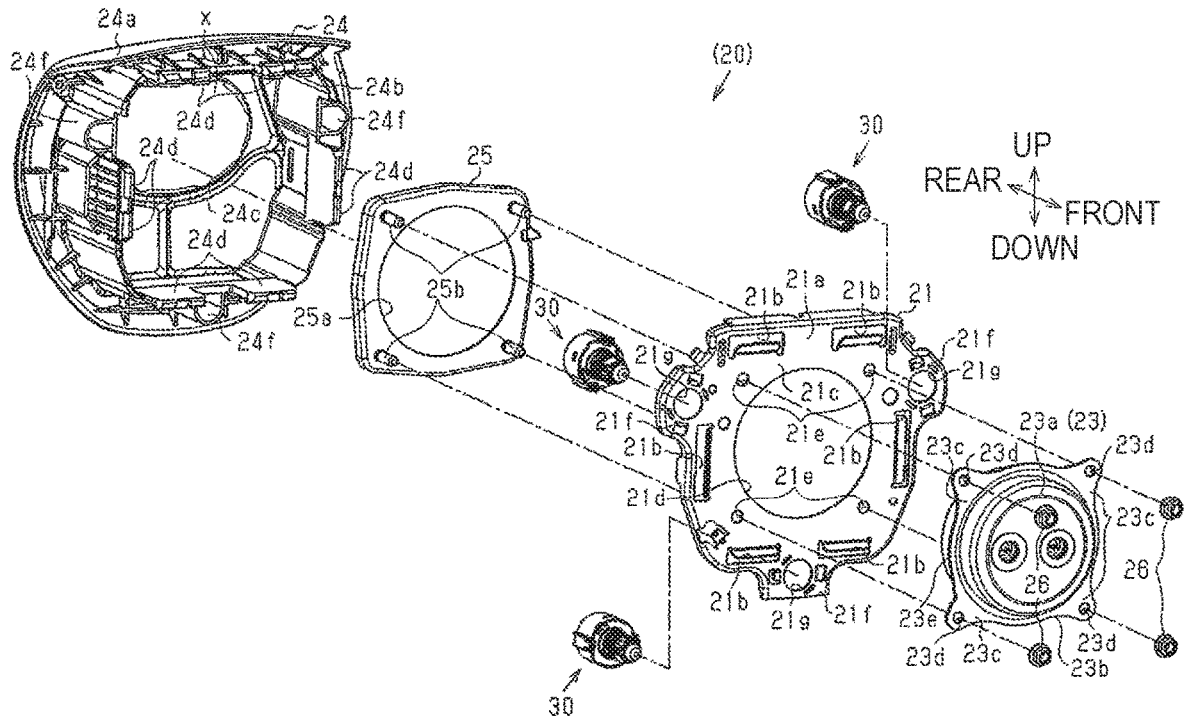
FIG. 5 is an exploded perspective view of the airbag device in the steering wheel of the embodiment.

As illustrated in FIGS. 3 to 5, the airbag device 20 is configured by assembling a pad portion 24, a ring retainer 25, an airbag (not illustrated), and an inflator 23 to the bag holder 21.

The pad portion 24 has an outer skin portion 24a of which the surface (rear surface) forms a design surface and an accommodating wall portion 24b which has a substantially rectangular annular shape and is erected on the rear surface side (front side) of the outer skin portion 24a. The space surrounded by the outer skin portion 24a, the accommodating wall portion 24b, and the bag holder 21 mainly constitutes a bag accommodating space x for accommodating the airbag (not illustrated). A thin portion 24c is formed at the portion forming the bag accommodating space x of the outer skin portion 24a so as to be pushed and broken when the airbag develops and expands.

A plurality of locking claws 24d each of which has a rectangular plate shape are integrally formed on a front end portion of the accommodating wall portion 24b. A locking protrusion 24e protruding toward a side away from the bag accommodating space x is formed in a front end portion of each locking claw 24d.

Switch supporting portions 24f for supporting the hone switch mechanisms 30 are respectively formed at a plurality of positions of the pad portion 24. Each switching supporting portion 24f is integrally formed with the accommodating wall portion 24b so as to extend from the outer skin portion 24a of the pad portion 24 to the rear surface side (front side).

Figure 6:
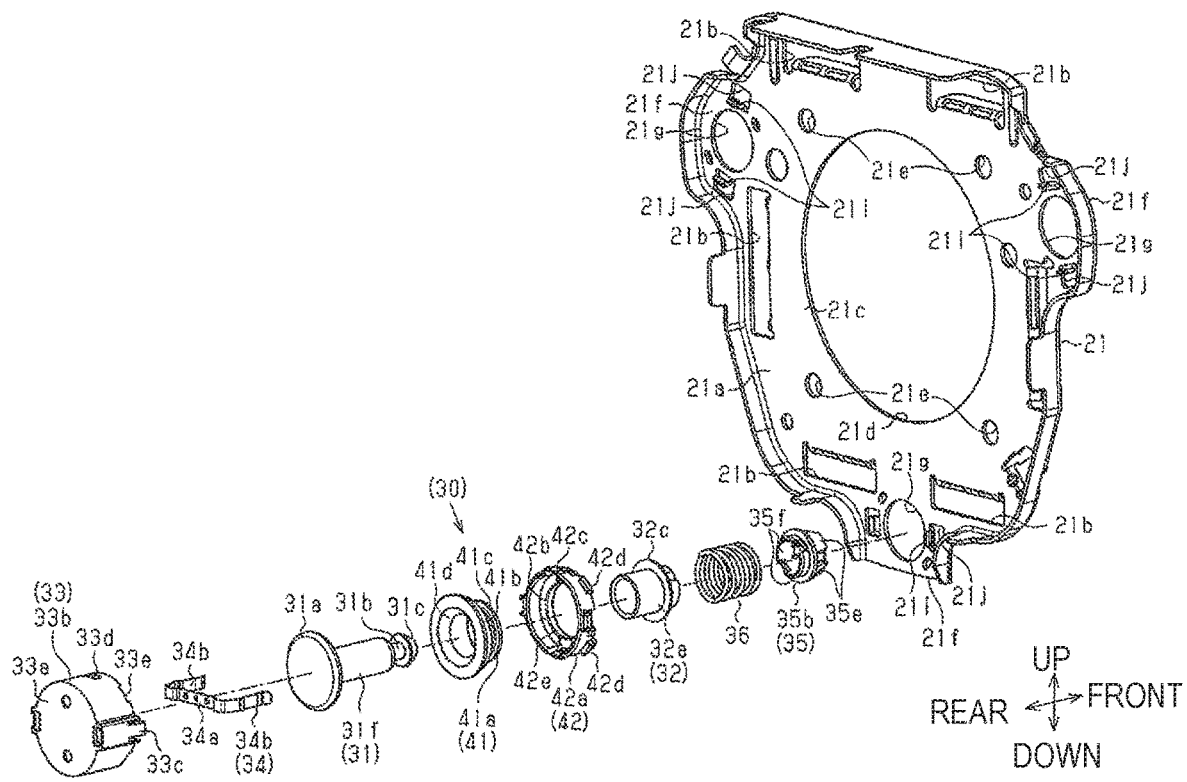
FIG. 6 is an exploded perspective view illustrating components of the horn switch mechanism in the steering wheel of the embodiment, together with a bag holder.

As illustrated in FIGS. 3, 5, and 6, the bag holder 21 is formed by performing press-working on a conductive metal plate. Instead of this, the bag holder 21 may be formed by performing die casting or the like using a conductive metallic material. A peripheral portion of the bag holder 21 is configured as a peripheral fixing portion 21a which has a substantially rectangular annular shape and is used for fixing the pad portion 24.

In the peripheral fixing portion 21a, claw locking holes 21b having a slit shape are respectively formed at front positions of the locking claws 24 described above and front end portions of the respective locking claws 24d are inserted into the claw locking hole 21b and locked.

An inner portion of the peripheral fixing portion 21a constitutes a base portion 21c. An opening portion 21d having a circular shape is formed in a central portion of the base portion 21c. Screw insertion holes 21e are formed in the base portion 21c at a plurality of positions near a peripheral edge of the opening portion 21d. In the base portion 21c, a part of the inflator 23 is attached in a state where the inflator 23 passes through the opening portion 21d.

More specifically, the inflator 23 has a body portion 23a having a low columnar shape and a flange portion 23b is formed on an outer circumferential surface of the body portion 23a. In the flange portion 23b, a plurality of attachment pieces 23c extend outward in a radial direction of the body portion 23a. In each attachment piece 23c, a screw insertion hole 23d is formed at a position in front of the screw insertion hole 21e of the bag holder 21. In the inflator 23, a portion further on a rear side of the flange portion 23b is configured as a gas ejecting portion 23e for ejecting an inflation gas. The gas ejecting portion 23e of the inflator 23 is inserted into the opening portion 21d of the bag holder 21 from the front side so as to protrude toward the bag accommodating space x side. Further, the flange portion 23b is brought into contact with the peripheral portion of the opening portion 21d and, in this state, the inflator 23 is attached to the bag holder 21 together with the ring retainer 25.

More specifically, the ring retainer 25 has an opening portion 25a having a circular shape which has a size similar to that of the opening portion 21d of the bag holder 21. In addition, the ring retainer 25 has mounting screws 25b at a plurality of positions behind the respective screw insertion hole 21e of the bag holder 21. An opening portion of an airbag (not illustrated) in a state where the airbag is folded in a developable and inflatable manner is disposed between the ring retainer 25 and the bag holder 21. A plurality of mounting screws 25b of the ring retainer 25 are inserted from the rear side with respect to the screw insertion hole (not illustrated) provided in the peripheral portion of the opening portion of the airbag and the respective screw insertion holes 21e and 23d of the bag holder 21 and the inflator 23. Furthermore, by fastening a nut 26 from the front side to each mounting screw 25b after insertion, the airbag is fixed to the bag holder 21 via the ring retainer 25 and the inflator 23 is fixed to the bag holder 21.

In a plurality of positions of the peripheral fixing portion 21a of the bag holder 21, attachment portions 21f for attaching the horn switch mechanisms 30 are respectively formed to protrude outward in the radial direction of the opening portion 21d having circular shape. Each attachment portion 21f is located in front of the switch supporting portion 24f of the pad portion 24 described above. An attachment hole 21g is formed in each attachment portion 21f. A plurality of pinching portions 21i extending rearward are integrally formed at the periphery of the respective attachment holes 21g in the bag holder 21. In the embodiment, each pinching portion 21i is formed by bending portions of the pinching portion 21i, the portions facing each other across each attachment hole 21g, backward. By bending the respective pinching portions 21i, holes 21j (see FIG. 7) are formed on the outside the pinching portion 21i, that is, on the side opposite to the pinching portion 21i with the attachment hole 21g interposed between the respective pinching portions 21i, of the respective pinching portions 21i in the bag holder 21.

Figure 2:
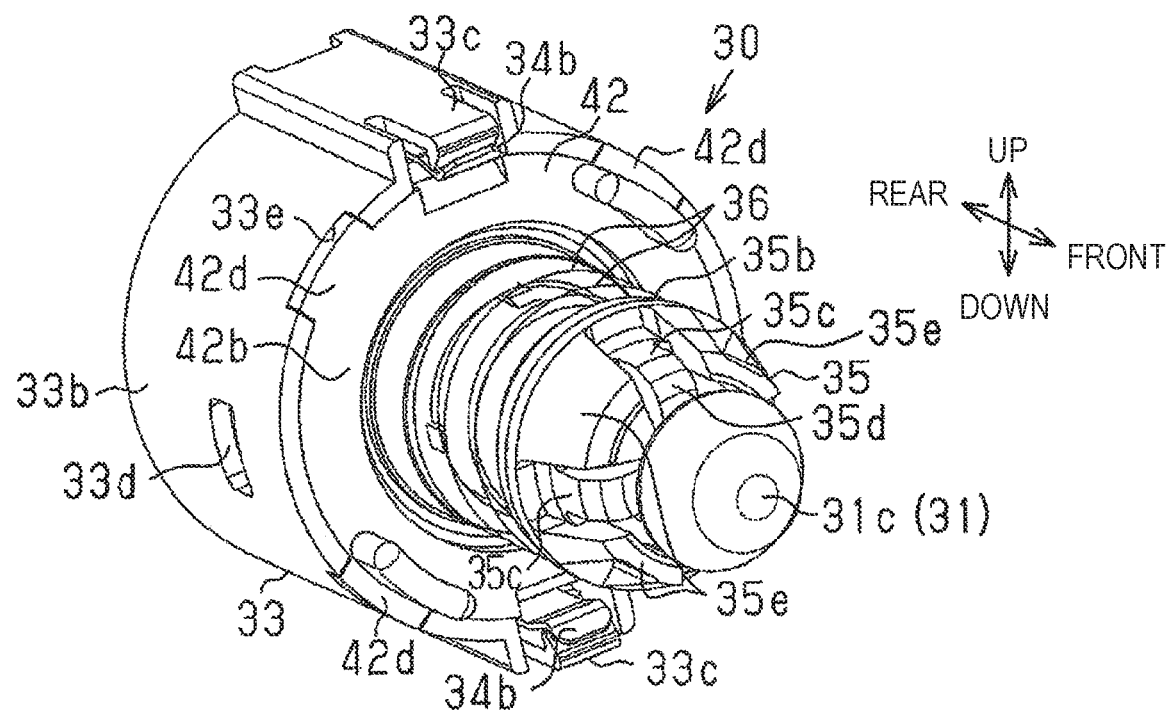
FIG. 2 is a perspective view of a horn switch mechanism in the steering wheel of the embodiment.

As illustrated in FIGS. 2, 6, and 7, each horn switch mechanism 30 includes a snap pin 31 as a support member, a pin holder 32 as a slider, a contact holder 33 as a cap member, a contact terminal 34 as a movable side contact portion, a spring receiving portion 35, and a coil spring 36 as an urging member. Next, each constituent member of the horn switch mechanism 30 will be described.

The snap pin 31 (support member) is formed of a metal material having conductivity. The support structure of the snap pin 31 for the core metal 12 will be described below. A main portion of the snap pin 31 is constituted of a shaft portion 31f having an elongated shape which extends in the front-rear direction along an axis L2 parallel to the axis L1 of the steering shaft and has a diameter smaller than the inner diameter of the attachment hole 21g of the bag holder 21. The shaft portion 31f of the snap pin 31 is inserted into the attachment hole 21g. The rear end portion of the shaft portion 31f functions as a fixed side contact portion. A locking groove 31b having an annular shape is formed on the rear side of a front end portion 31c in the shaft portion 31f. A collar portion 31a having a diameter larger than that of the other portion of the shaft portion 31f is formed on the outer peripheral portion of the rear end of the shaft portion 31f. The outer diameter of the collar portion 31a is set to be larger than the inner diameter of the attachment hole 21g of the bag holder 21.

Figure 8:
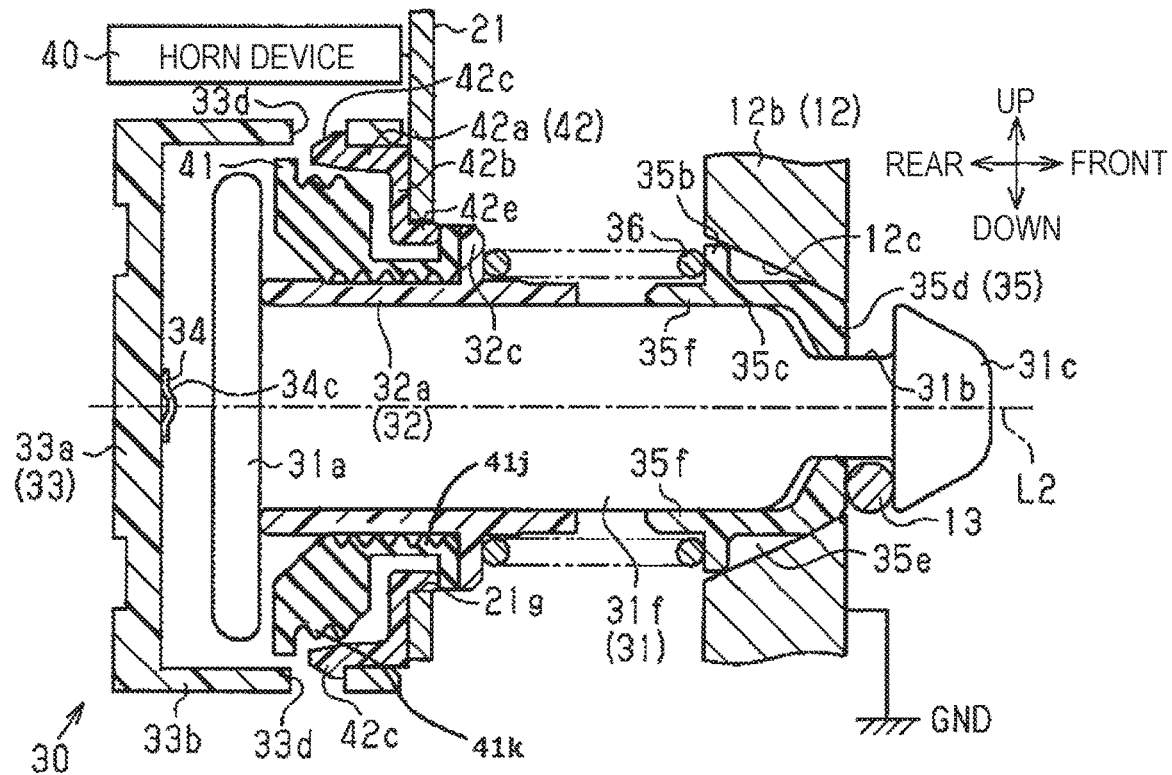
FIG. 8 is also a partial longitudinal cross-sectional view illustrating a cross-sectional structure of the horn switch mechanism and a peripheral portion in a cross-section different from that of FIG. 7.
Figure 9:
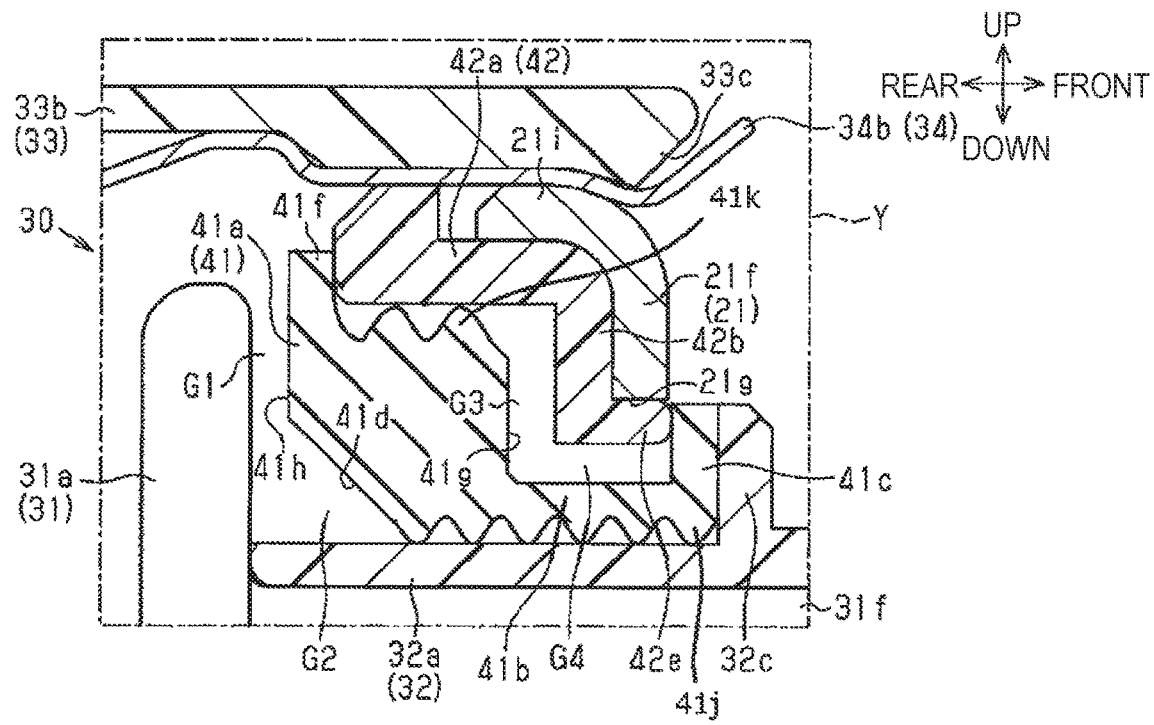
FIG. 9 is an enlarged partial longitudinal cross-sectional view of a Y portion in FIG. 7.
Figure 10:
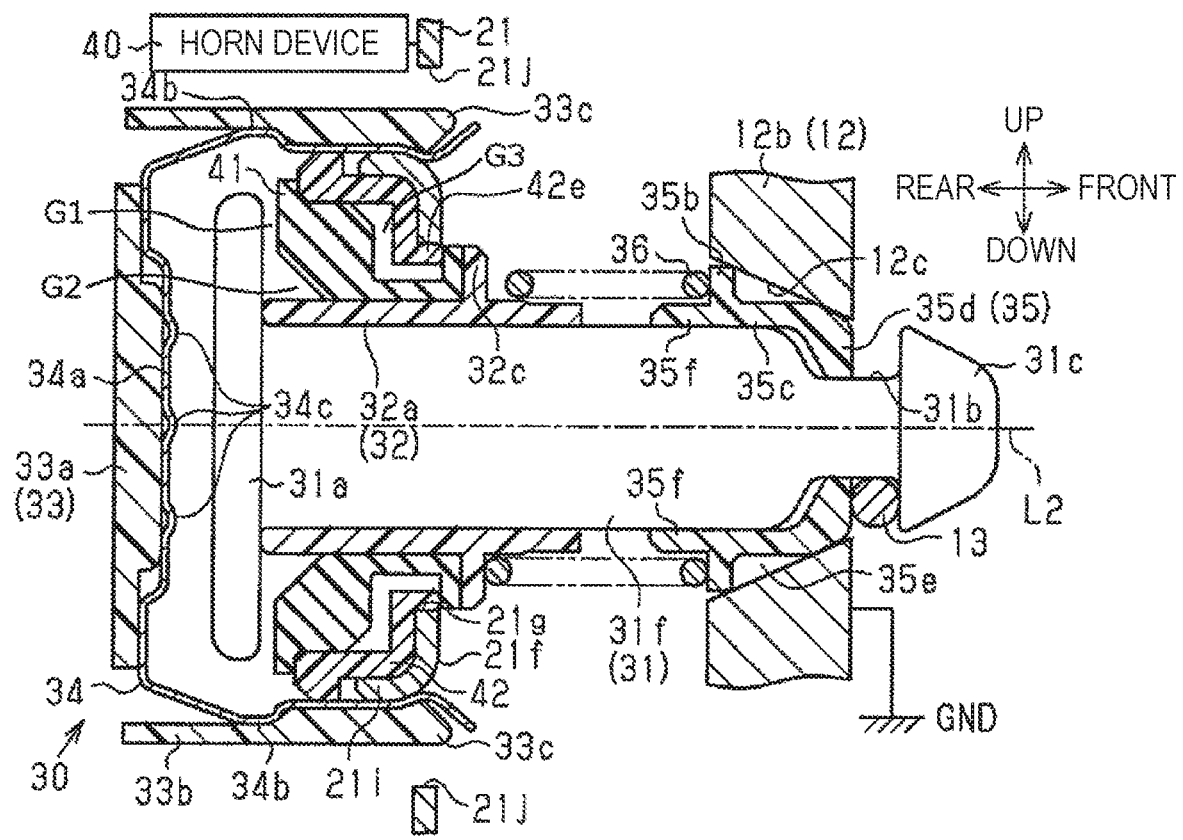
FIG. 10 is a partial longitudinal cross-sectional view illustrating a horn switch mechanism and a peripheral portion in a steering wheel of the related art.

As illustrated in FIGS. 7 to 9, the pin holder 32 (slider) is formed of a resin material having insulating properties. The main portion of the pin holder 32 is constituted of a tubular portion 32a of which the front end and the rear end are open. The tubular portion 32a is put on the outside of the shaft portion 31f of the snap pin 31. The pin holder 32 is used as a slider which slides back and forth along the shaft portion 31f when the horn switch mechanism 30 is operated.

A receiving portion 32c which has an annular shape and protrudes outward in the radial direction of the tubular portion 32a is formed at an intermediate portion of the tubular portion 32a in the front-rear direction. The receiving portion 32c has a function of receiving the rear end portion of the coil spring 36. Further, the receiving portion 32c is formed at the outer peripheral portion of the tubular portion 32a at a position immediately in front of a transmission portion 42e described below. Further, the outer diameter of the receiving portion 32c is set to be larger than the dimension necessary for receiving the rear end portion of the coil spring 36. Due to such a setting related to the forming position and the outer diameter of the receiving portion 32c, the receiving portion 32c also serves as the transmitted portion through which the forward movement of the damper holder 42 is transmitted through the transmission portion 42e.

Figure 11:
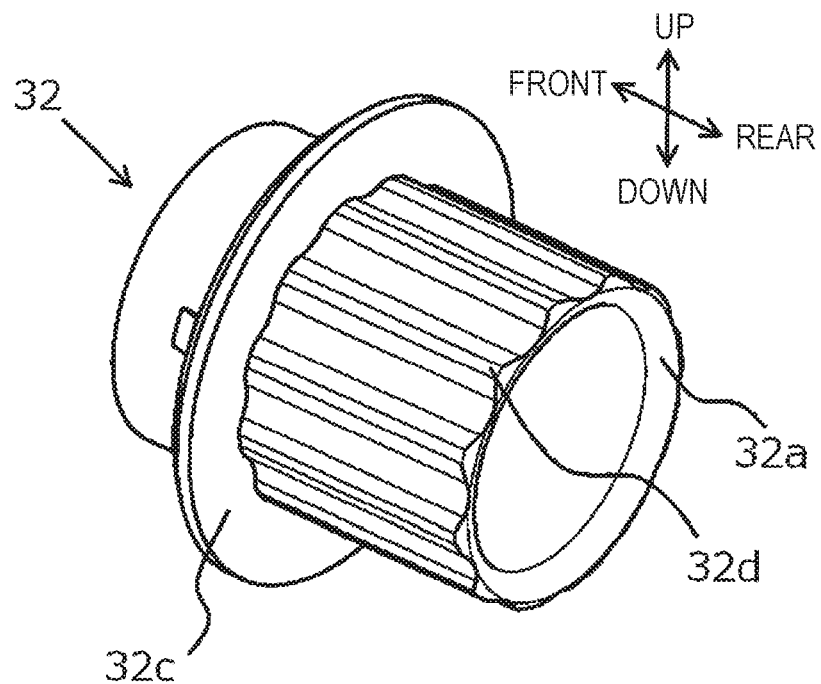
FIG. 11 is a perspective view of a pin holder in the steering wheel of the embodiment.

Further, as illustrated in FIG. 11, the pin holder 32 includes a plurality of pin holder ribs 32d protruding outward in the radial direction of the tubular portion 32a. The pin holder rib 32d is set in a portion between the rear end of the tubular portion 32a and the receiving portion 32c and extends in the front-rear direction. By setting the pin holder rib 32d, the area of the contact surface between the pin holder 32 and the elastic member 41 can be reduced, and thus a frictional force generated in the contact surface between the pin holder 32 and the elastic member 41 can be reduced. Therefore, abnormal noise generated when the contact surface between the damper holder 42 and the elastic member 41 is displaced is suppressed.

As illustrated in FIGS. 6 to 8, the contact holder 33 (cap member) is formed of a resin material having insulating properties. The contact holder 33 includes a top plate portion 33a having a substantially disc shape and a peripheral wall portion 33b which has a substantially cylindrical shape and extends forward from the outer peripheral edge of the top plate portion 33a. The contact holder 33 covers at least the collar portion 31a of the snap pin 31 and at least the rear end portion of the tubular portion 32a of the pin holder 32 in a state where the contact holder 33 is separated rearward from the rear end portion of the tubular portion 32a of the pin holder 32. A plurality of hook portions 33c are formed so as to be elastically deformable in the radial direction at a plurality of positions spaced apart from each other in the circumferential direction of the peripheral wall portion 33b.

Claw engaging holes 33d (see FIGS. 6 and 8) are formed at a plurality of positions spaced apart from each other in the circumferential direction at an intermediate portion of the peripheral wall portion 33b in the front-rear direction. Notches 33e (see FIGS. 2 and 6) having an arcuate shape are formed at a plurality of positions spaced apart from each other in the circumferential direction at the front end portion of the peripheral wall portion 33b.

The contact terminal 34 (movable side contact portion) is formed by performing press working on a band-shaped metal plate having conductivity. The contact terminal 34 includes a body portion 34a extending in the radial direction of the contact holder 33 and a pair of side portions 34b extending forward from both ends of the body portion 34a.

A plurality of contact protrusion portions 34c protruding to the front side are respectively formed at a plurality of positions in the longitudinal direction of the body portion 34a. Most of the portion of the rear surface of the body portion 34a excluding the contact protrusion portions 34c is in contact the front surface of the top plate portion 33a of the contact holder 33.

Each side portion 34b is in contact with the inner wall surface of the peripheral wall portion 33b of the contact holder 33 in a state where the side portion 34b is engaged therewith. By the engagement, the contact terminal 34 is mounted in a state where the contact terminal 34 is positioned in the contact holder 33.

As illustrated in FIGS. 2 and 7, the spring receiving portion 35 is formed of a resin material having insulating properties. A part of the spring receiving portion 35 is constituted of a receiving portion 35b having an annular plate shape. The outer diameter of the receiving portion 35b is set to be approximately equal to the outer diameter of the coil spring 36 and the outer diameter of the rear end portion in the inner wall surface of the through hole 12c, that is, the maximum diameter in the tapered inner wall surface.

Locking pieces 35c extend forward from a plurality of positions spaced apart from each other in the circumferential direction of the receiving portion 35b. In the front end portion of each locking piece 35c, a claw portion 35d protrudes radially inward. In the receiving portion 35b, a plurality of engagement pieces 35e extend forward from a portion between the locking pieces 35c adjacent in the circumferential direction. At least a part of the outer surface of each the engagement piece 35e constitutes a part of a tapered surface of which the diameter is increased as the tapered surface extends toward the rear side.

A pair of mounting portions 35f extend rearward from the receiving portion 35b. Each mounting portion 35f is curved so as to bulge outward in the radial direction of the receiving portion 35b corresponding to the outer shape of the shaft portion 31f of the snap pin 31.

The receiving portion 35b and both mounting portions 35f of the spring receiving portion 35 are fitted to the shaft portion 31f of the snap pin 31. Further, each claw portion 35d enters a locking groove 31b, such that the spring receiving portion 35 is attached to the snap pin 31 so as not to be detachable. As described above, in the spring receiving portion 35, the outer surfaces of the plurality of engagement pieces 35e are intermittently arranged in the circumferential direction with the plurality of locking pieces 35c interposed therebetween. Due to such a configuration, the entirety of the spring receiving portion 35 has a form similar to a tapered outer peripheral surface of which the diameter is increased as the tapered surface extends to the rear side.

The coil spring 36 (urging member) is wound around the shaft portion 31f of the snap pin 31, the tubular portion 32a of the pin holder 32, and both mounting portions 35f of the spring receiving portion 35. The coil spring 36 is arranged between the receiving portion 32c of the pin holder 32 and the receiving portion 35b of the spring receiving portion 35 in a state where the coil spring 36 is compressed.

In this way, a plurality of single parts, that is, the snap pin 31, the pin holder 32, the contact holder 33, the contact terminal 34, the coil spring 36, and the spring receiving portion 35, are unitized and form an assembled horn switch mechanism 30. Therefore, it is possible to treat the unitized horn switch mechanism 30 as one assembly when the horn switch mechanism 30 is attached or replaced.

As illustrated in FIGS. 6, 7, and 9, the elastic member 41 is formed of an elastic material such as rubber (for example, EPDM, silicone rubber, and the like), elastomer, or the like.

The main portion of the rear portion of the elastic member 41 is constituted of an elastic body portion 41a having an annular shape and the front portion of the elastic member 41 is constituted of an elastic cylindrical portion 41b and an elastic plate-shaped portion 41c. In the elastic member 41, the entirety of a front end surface 41g of the elastic body portion 41a and the entirety of a rear end surface 41h are set to be target surfaces. In the elastic member 41, the target surfaces are arranged in a state where the target surfaces are separated from members facing the target surfaces, the members located on the front side of the elastic body portion 41a and members located on the rear side of the elastic body portion 41a.

In the embodiment, the entirety of the front end surface 41g of the elastic body portion 41a is spaced rearward from a member located on the front side of the elastic body portion 41a. The corresponding member is a bottom wall portion 42b of the damper holder 42 described below. Due to such a configuration, a gap G3 having an annular shape is formed in a portion between the bottom wall portion 42b and the elastic body portion 41a.

The entirety of the rear end surface 41h of the elastic body portion 41a is spaced forward from a member located on the rear side of the elastic body portion 41a. The corresponding member is the collar portion 31a of the snap pin 31 described above. Due to such a configuration, a gap G1 having an annular shape is formed in a portion between the elastic body portion 41a and the collar portion 31a.

The rear portion of the inner peripheral surface of the elastic body portion 41a is constituted of a tapered surface 41d of which the diameter is increased as the tapered surface extends to the rear side. Between the tapered surface 41d of the elastic body portion 41a and the tubular portion 32a of the pin holder 32, a gap G2 is formed in a state where the gap G2 is connected to the gap G1 described above.

An annular protrusion portion 41f protruding outward in the radial direction is provided on the outer peripheral portion of the rear end of the elastic body portion 41a. The annular protrusion portion 41f is radially inwardly spaced from the peripheral wall portion 33b of the contact holder 33.

The elastic cylindrical portion 41b has a cylindrical shape with a small thickness and extends forward from the inner peripheral portion of the elastic body portion 41a. The elastic plate-shaped portion 41c protrudes radially outward from the outer peripheral portion of the front end of the elastic cylindrical portion 41b and has an annular plate shape with a small thickness. The outer diameter of the elastic plate-shaped portion 41c is set to be approximately equal to the outer diameter of the receiving portion 32c (transmitted portion).

The elastic member 41 (mainly the elastic body portion 41a) constitutes a dynamic damper together with the airbag device 20 described above. In the embodiment, the elastic member 41 (mainly the elastic body portion 41a) functions as a spring of the dynamic damper and the airbag device 20 functions as a damper mass.

In this case, by tuning the size (the respective sizes in the radial direction and the front-rear direction) of the elastic member 41 (elastic body portion 41a), the resonance frequencies in the up-down direction and the right-left direction of the dynamic damper are set to the damping target frequencies, that is, the frequencies to be damped, in relation to the vibration in the up-down direction and the right-left direction of the steering wheel 10.

Further, the elastic member 41 includes a plurality of inner ribs 41j which protrude inward in the radial direction and extend in the circumferential direction. The inner rib 41j is set in a portion between the front end of the tapered surface 41d and the front end of the elastic plate-shaped portion 41c. The elastic member 41 has a plurality of outer ribs 41k which protrude radially outward and extend in the circumferential direction. In the elastic body portion 41a, the outer ribs 41k are set in a portion between the front end of the annular protrusion portion 41f and the front end surface 41g. By setting the inner ribs 41j and the outer ribs 41k, the area of the contact surface between the slider 32 and the elastic member 41 and the area of the contact surface between the damper holder 42 and the elastic member 41 are smaller than those of the normal surface contact, and thus it is possible to reduce the frictional force generated in the contact surface between the slider 32 and the elastic member 41 and the contact surface between the damper holder 42 and the elastic member 41. Therefore, abnormal noise generated when the contact surface between the slider 32 and the elastic member 41 and the contact surface between the damper holder 42 and the elastic member 41 are displaced is suppressed. Furthermore, by setting the inner ribs 41j and the outer ribs 41k extending in the circumferential direction on the inner diameter side and the outer diameter side of the elastic member 41, the inner ribs 41j and the outer ribs 41k are deformed when the elastic member 41 moves rearward, such that the energy of the elastic member 41 moving backward can be absorbed. Therefore, it is possible to suppress the amount of movement and the effect of suppressing the abnormal noise is further improved.

The damper holder 42 is formed of a resin material having insulating properties. The damper holder 42 is located between the elastic member 41 and the pinching portion 21i of the bag holder 21 and is disposed behind the attachment portion 21*f* of the bag holder 21. The damper holder 42 covers a part of the pin holder 32 in the axial direction.

As illustrated in FIGS. 6, 8, and 9, the main part of the damper holder 42 is constituted of the peripheral wall portion 42*a* and the bottom wall portion 42*b* which is formed at the front end portion of the peripheral wall portion 42*a* and forms the bottom portion of the damper holder 42. Engagement claws 42*c* are formed at a plurality of circumferentially spaced apart positions of the peripheral wall portion 42*a*. Those engagement claws 42*c* are engaged from the inside to the corresponding claw engaging holes 33*d* of the contact holder 33.

In the outer peripheral portion of the front end of the peripheral wall portion 42*a*, stoppers 42*d* are formed at a plurality of positions which are circumferentially spaced apart from each other and circumferentially spaced apart from the engagement claws 42*c*. Those stoppers 42*d* are engaged with the corresponding notches 33*e* of the contact holder 33. By the engagement, circumferential positioning of the damper holder 42 is made with respect to the contact holder 33. In addition, due to the engagement of each stopper 42*d* with the notch 33*e* and engagement of each engagement claw 42*c* with the claw engaging hole 33*d*, the peripheral wall portion 33*b* is interposed from both the front direction and the rear direction. Therefore, the positioning of the damper holder 42 in the front-rear direction (axial direction) is performed with respect to the contact holder 33.

As illustrated in FIGS. 6 and 9, the bottom wall portion 42*b* of the damper holder 42 is formed in an annular plate shape and the inner peripheral portion thereof is located behind the receiving portion 32*c* described above. The bottom wall portion 42*b* is disposed at a position spaced forward from the elastic body portion 41*a* of the elastic member 41. Due to such an arrangement, a gap G3 having an annular shape is formed in a portion between the bottom wall portion 42*b* and the elastic body portion 41*a*.

The transmission portion 42*e* having an annular shape protrudes forward from the inner peripheral portion of the bottom wall portion 42*b*. The transmission portion 42*e* is inserted through the attachment hole 21*g* of the bag holder 21 and is in contact with the elastic plate-shaped portion 41*c* of the elastic member 41 immediately behind the receiving portion 32*c* of the pin holder 32. In other words, the transmission portion 42*e* is indirectly brought into contact with the receiving portion 32*c* via the elastic plate-shaped portion 41*c*.

The transmission portion 42*e* is disposed at a position spaced radially outward from the elastic cylindrical portion 41*b* of the elastic member 41. Due to such an arrangement, a gap G4 having an annular shape is formed between the elastic cylindrical portion 41*b* and the transmission portion 42*e* in a state where the gap G4 is connected to the gap G3 described above.

In a state where each horn switch mechanism 30 is attached to the bag holder 21 via the elastic member 41 and the damper holder 42 as described above, the pin holder 32 supports the bag holder 21 so as to be movable forward and backward with respect to the snap pin 31 while preventing contact between the snap pin 31 and the bag holder 21, that is, while keeping the insulated state. Further, the pin holder 32 transmits the rearward biasing force of the coil spring 36 to the collar portion 31*a* of the snap pin 31.

Also, a pair of pinching portions 21*i* is interposed between the damper holder 42 and the side portion 34*b* of the contact terminal 34. The side portion 34*b* is brought into contact with the outer surface of the pinching portion 21*i* by each hook portion 33*c* of the contact holder 33. By this contact, the bag holder 21 and the contact terminal 34 are conducted.

Further, the front end portion of the side portion 34*b* biased by the hook portion 33*c* is engaged with the pinching portions 21*i*. The side portion 34*b* regulates that the contact holder 33, and even the horn switch mechanism 30, is moved backward from the bag holder 21.

Figure 12:
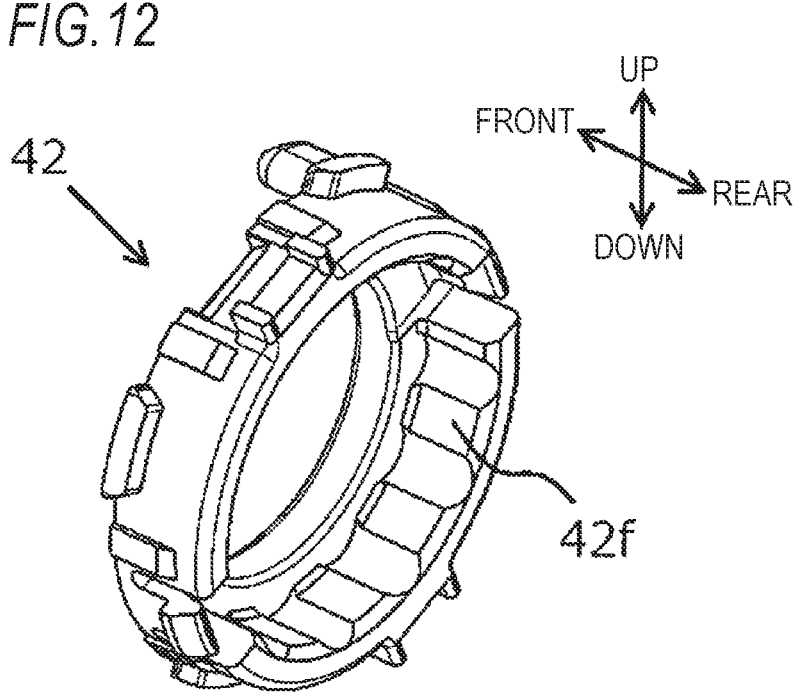
FIG. 12 is a perspective view of a damper holder in the steering wheel of the embodiment.

Further, as illustrated in FIG. 12, the damper holder 42 has a plurality of damper holder ribs 42*f* protruding inward in the radial direction of the peripheral wall portion 42*a* and the damper holder rib 42*f* extends in the front-rear direction. By setting the damper holder ribs 42*f*, the contact area between the damper holder 42 and the elastic body portion 41*a* becomes small, and thus the frictional force generated in the contact surface between the damper holder 42 and the elastic member 41 can be reduced. Therefore, abnormal noise generated when the contact surface between the damper holder 42 and the elastic member 41 is displaced is suppressed.

Talc is interposed between the slider 32 and the elastic member 41 and between the damper holder 42 and the elastic member 41. (Not illustrated) Specifically, by assembling the slider 32 and the damper holder 42 after the talc is applied to the elastic member 41, the talc is interposed between the slider 32 and the elastic member 41 and between the damper holder 42 and the elastic member 41.

Talc is a finely pulverized natural mineral containing magnesium silicate as a main component and examples thereof include soapstone C manufactured by Sobueclay Co., Ltd. and the like. Talc is also called solid lubricant. It is possible to reduce the frictional force generated in the contact surface between the slider 32 and the elastic member 41 and the contact surface between the damper holder 42 and the elastic member 41 by interposing talc between the slider 32 and the elastic member 41 and between the damper holder 42 and the elastic member 41, and thus abnormal noise generated when the contact surface between the slider 32 and the elastic member 41 and the contact surface between the damper holder 42 and the elastic member 41 are displaced is suppressed.

Next, the operation of assembling the airbag device 20 to the core metal 12 via the plurality of horn switch mechanisms 30 described above will be described.

As illustrated in FIGS. 7 and 8, in this operation, the snap pin 31 of each horn switch mechanism 30 is inserted from the rear side into the through hole 12*c* of the corresponding holding portion 12*b* in the core metal 12. With the insertion, the receiving portion 35*b* of the spring receiving portion 35 approaches the holding portion 12*b* and the engagement piece 35*e* approaches the inner wall surface of the through hole 12*c*. Further, the front end portion 31*c* of the shaft portion 31*f* of the snap pin 31 is in contact with the clip 13. Further, when the snap pin 31 or the like is moved forward against the biasing force of the clip 13, the clip 13 is elastically deformed radially outward of the snap pin 31. When the snap pin 31 is moved to a position where the locking groove 31*b* faces the clip 13, the clip 13 tries to enter the locking groove 31*b* due to its own elastic restoring force.

In the locking groove 31*b*, the claw portion 35*d* of the spring receiving portion 35 urged in the forward direction by the coil spring 36 enters. Therefore, in the process of entering into the locking groove 31*b*, the clip 13 enters in a portion between the claw portion 35*d* and the front end portion 31*c* while the coil spring 36 is compressed rearward. Due to the entrance, in the locking groove 31*b*, the claw portion 35*d* is located behind the clip 13. In the clip 13, a portion located in front of the through hole 12*c* is interposed from the front side and the rear side by the claw portion 35*d* urged forward by the coil spring 36 and the front end portion 31*c*, and thus the movement of the clip 13 is restricted. On the other hand, the movement of the snap pin 31 in the front-rear direction is regulated by the clip 13 which enters the locking groove 31*b*. In this way, fastening of each horn switch mechanism 30 to the core metal 12 and attachment of the airbag device 20 to the core metal 12 are performed by locking the snap pin 31 to the core metal 12 by the clip 13. The structure in which the snap pin 31 is locked to the core metal 12 by the elasticity of the clip 13 as it is inserted into the through hole 12*c* is also called a snap fit structure.

In the assembled state with the snap fit structure described above, the snap pin 31 of each horn switch mechanism 30 locked to the core metal 12 supports the bag holder 21 of the airbag device 20 via the pin holder 32 so as to be able to advance or retract relative to the core metal 12, that is, to be able to approach or separate with respect to the core metal 12.

Next, the operation of the steering wheel 10 of the embodiment configured as described above will be described.

In a normal state where no impact is applied to a car from the front side due to a frontal collision or the like, gas is not ejected from the gas ejecting portion 23*e* of the inflator 23 in the airbag device 20, and thus the airbag is kept in a folded state.

As illustrated in FIGS. 7 and 8, when the airbag device 20 cannot be pressed down in the normal state, the contact protrusion portion 34*c* of the contact terminal 34 separates rearward from the rear end portion (fixed side contact portion) of the snap pin 31. The contact terminal 34 and the snap pin 31 becomes in a state where conduction thereof is blocked, and thus the horn device 40 does not operate. In this case, a backward biasing force of the coil spring 36 is applied to the collar portion 31*a* of the snap pin 31 locked to the core metal 12 by the clip 13 via the pin holder 32.

Also, the forward biasing force of the coil spring 36 is applied to the spring receiving portion 35 through the receiving portion 35*b* and the claw portion 35*d* which enters the locking groove 31*b* of the snap pin 31 in the spring receiving portion 35 presses the clip 13 in the locking groove 31*b* to the forward direction. Due to the pressing, the clip 13 is interposed from the front side and the rear side by the front end portion 31*c* and the claw portion 35*d*, and thus the movement of the clip 13 is restricted.

Furthermore, the pin holder 32 is interposed between the shaft portion 31*f* of the snap pin 31 and the side portion 34*b* of the contact terminal 34 so as to insulate the shaft portion 31*f* and the side portion 34*b*.

In this case, the load of the airbag device 20 is mainly transmitted to the pin holder 32 via the contact holder 33, the damper holder 42, and the elastic member 41.

Here, the rear end portion of the tubular portion 32*a* of the pin holder 32 is separated forward from the top plate portion 33*a* of the contact holder 33. Accordingly, the load of the airbag device 20 is not directly transmitted to the pin holder 32 via the contact holder 33.

Therefore, when, in a normal state described above, the vibration in the up-down direction and the right-left direction is transmitted to the steering wheel 10 during high-speed travelling of a car or idling of an in-vehicle engine, the vibration is transmitted to the airbag device 20 via the core metal 12 and each horn switch mechanism 30.

When the vibration is transmitted to the steering wheel 10 as described above, the airbag device 20 functions as a damper mass of the dynamic damper and the elastic body portion 41*a* of the elastic member 41 mainly functions as a spring of the dynamic damper in accordance with the vibration.

In this case, as illustrated in FIG. 9, the gap G3 between the elastic body portion 41*a* and the member (the bottom wall portion 42*b* of the damper holder 42) located on the front side of the elastic body portion 41*a* allows the forward-direction elastic deformation of the elastic body portion 41*a*. Particularly, in the embodiment, since the entirety of the front end surface 41*g* of the elastic body portion 41*a* is spaced apart from the bottom wall portion 42*b*, the gap G3 becomes larger as compared with a case where a part of the front end surface 41*g* is in contact with the bottom wall portion 42*b*, and thus the allowable amount of elastic deformation is large. It is difficult for the front end surface 41*g* of the elastic body portion 41*a* to come into contact with the bottom wall portion 42*b*, and thus frictional force accompanying the contact is hardly generated. The elastic body portion 41*a* is easily elastically deformed in the forward direction as compared with a case where the elastic body portion 41*a* is in contact with the bottom wall portion 42*b*.

In this case, the gap G1 between the elastic body portion 41*a* and the member (the collar portion 31*a* of the snap pin 31) located on the rear side of the elastic body portion 41*a* allows the rearward-direction elastic deformation of the elastic body portion 41*a*. Particularly, in the embodiment, since the entirety of the rear end surface 41*h* of the elastic body portion 41*a* is spaced apart from the collar portion 31*a*, the gap G1 becomes larger as compared with a case where a part of the rear end surface 41*h* is in contact with the collar portion 31*a*, and thus the allowable amount of elastic deformation is large. It is difficult for the rear end surface 41*h* of the elastic body portion 41*a* to come into contact with the collar portion 31*a*, and thus frictional force accompanying the contact is hardly generated. The elastic body portion 41*a* is easily elastically deformed in the rear direction as compared with a case where the elastic body portion 41*a* is in contact with the collar portion 31*a*.

Accordingly, the elastic body portion 41*a* vibrates (resonates) in the up-down direction, the right-left direction, and the like with the airbag device 20 while the elastic body portion 41*a* is elastically deformed at a resonance frequency which is the same as or close to a target frequency of the vibration of the steering wheel 10, such that the elastic body portion 41*a* absorbs the vibration energy of the steering wheel 10. With the absorption, the vibration of the steering wheel 10 in the up-down direction, the right-left direction is suppressed (damped).

Since the gap G2 is formed in a portion between the tapered surface 41*d* of the elastic body portion 41*a* and the tubular portion 32*a* of the pin holder 32, the elastic member 41 can also be elastically deformed in the gap G2. Therefore, the elastic member 41 is more likely to be elastically deformed in the radial direction or the like as compared with a case where the gap G2 is not formed.

Further, since the gap G4 is formed in a portion between the elastic cylindrical portion 41*b* and the transmission portion 42*e*, in the gap G4, the elastic cylindrical portion 41*b* can also be elastically deformed in the radial direction. The elastic cylindrical portion 41*b* is more likely to be elastically deformed in the radial direction as compared with a case where the gap G4 is not formed.

In the normal state described above, when the airbag device 20 is pressed down for operation of the horn device 40, the force applied to the airbag device 20 is transmitted to the contact terminal 34 and the damper holder 42 via the contact holder 33 in at least one horn switch mechanism 30. The damper holder 42 is pushed forward and the movement of the damper holder 42 is transmitted to the pin holder 32 via the transmission portion 42e and the receiving portion 32c. That is, although the transmission portion 42e moves forward with the damper holder 42, the movement is indirectly transmitted via the elastic plate-shaped portion 41c of the elastic member 41 to the receiving portion 32c located immediately in front of the transmission portion 42e. In addition to the function of receiving the rearward biasing force of the coil spring 36, the receiving portion 32c also functions as a transmitted portion and receives a forward force transmitted from the damper holder 42 (transmission portion 42e).

By the force transmission, the pin holder 32 is caused to slide forward along the shaft portion 31f of the snap pin 31 against the coil spring 36. Also, the contact terminal 34 moves forward with the contact holder 33.

In this case, the coil spring 36 is compressed and the repulsive force increases, as the airbag device 20 is pushed down. Therefore, the operation load increases and the operation feeling becomes satisfactory.

When at least one of the plurality of contact protrusion portions 34c of the contact terminal 34 comes into contact with the rear end surface of the snap pin 31, the core metal 12 and the bag holder 21 connected to a ground GND (car body ground) are conducted through the clip 13, the snap pin 31, and the contact terminal 34. Due to the conduction, the horn switch mechanism 30 is closed and the horn device 40 electrically connected to the bag holder 21 is activated.

Meanwhile, when an impact is applied to a car from the front side due to a frontal collision or the like, the driver tries to lean forward due to inertia. On the other hand, in the airbag device 20, the inflator 23 is activated in response to the impact and gas is injected from the gas ejecting portion 23e. The airbag develops and expands by the gas supplied to the airbag. With this airbag, when the pressing force applied to the outer skin portion 24a of the pad portion 24 increases, the outer skin portion 24a is broken at the thin portion 24c. The airbag is continuously developed and expanded rearward through an opening formed by the rupture. The developed and expanded airbag intervenes in front of a driver attempting to lean forward due to the impact of the frontal collision, such that the forward tilting of the driver is restrained and the driver is protected from the impact.

When the airbag is expanded rearward, a force toward the rearward direction is applied to the bag holder 21. In this regard, in the embodiment, the snap pin 31 of each horn switch mechanism 30 is supported by the core metal 12 (holding portion 12b). The collar portion 31a formed in the rear end portion of each snap pin 31 is located behind the attachment hole 21g of the bag holder 21. Moreover, the collar portion 31a has an outer diameter larger than the inner diameter of the attachment hole 21g. Therefore, when the bag holder 21 moves backward, the collar portion 31a functions as a stopper by coming into contact with the peripheral portion of the attachment hole 21g in the bag holder 21. Therefore, excessive backward movement of the bag holder 21 and even the airbag device 20 is regulated by the collar portion 31a of the snap pin 31.

According to the embodiment described in detail above, the following effects can be obtained.

(1) The pin holder 32 (slider) having a cylindrical shape covers the shaft portion 31f of the snap pin 31 (support member) inserted into the bag holder 21 of the airbag device 20 so as to be slidable in the front-rear direction. A part of the axial region of the snap pin 31 is covered with the damper holder 42 having an annular shape. The elastic member 41 is interposed between the pin holder 32 and the damper holder 42.

The entirety of the front end surface 41g of the elastic body portion 41a of the elastic member 41 is spaced rearward from the member (the bottom wall portion 42b of the damper holder 42) located on the front side of the elastic body portion 41a. The entirety of the rear end surface 41h of the elastic body portion 41a is spaced forward from the member (the collar portion 31a of the snap pin 31) located on the rear side of the elastic body portion 41a (FIGS. 7 and 9).

Therefore, it is easy to elastically deform the elastic body portion 41a to both the forward direction and the rearward direction and, when the steering wheel 10 vibrates in the up-down direction or the right-left direction, the elastic body portion 41a can be caused to vibrate at the target resonance frequency. Therefore, the effect of suppressing the vibration of the steering wheel 10 can be improved.

(2) The pin holder 32 is biased rearward by the coil spring 36 (biasing member). At least the rear end portions of the snap pin 31 and the pin holder 32 are covered with the contact holder 33 (cap member) in a state where the contact holder 33 is separated backward from the rear end portion of the pin holder 32. The contact terminal 34 (movable side contact portion) is attached to the inner side of the contact holder 33 and the damper holder 42 is attached to the contact holder 33 (FIG. 7).

Therefore, when the airbag device 20 is pushed down, it is possible to slide the pin holder 32 to the forward direction against the coil spring 36 by moving the contact holder 33 to the forward direction in accordance with the pushing-down of the airbag device 20. In the process of sliding, the horn device 40 can be operated by bringing the contact terminal 34 into contact with the rear end portion (fixed side contact portion) of the snap pin 31.

(3) The transmission portion 42e is provided on the inner peripheral portion of the bottom wall portion 42b in the damper holder 42. The receiving portion 32c as a transmitted portion is provided at a position immediately in front of the transmission portion 42e at the outer peripheral portion of the pin holder 32. Then, the forward movement of the damper holder 42 accompanying the pushing-down of the airbag device 20 is transmitted to the pin holder 32 via the transmission portion 42e and the receiving portion 32c (FIGS. 7 and 9).

Therefore, when the airbag device 20 is pushed down for the operation of the horn device 40, the force applied to the airbag device 20 is transmitted to the pin holder 32 via the contact holder 33 and the damper holder 42, such that it is possible to slide the pin holder 32 to the forward direction against the coil spring 36 (biasing member). In the process of sliding, the horn device 40 can be operated by bringing the contact terminal 34 into contact with the rear end portion (fixed side contact portion) of the snap pin 31.

In the embodiment, a unit in Which the entirety of the inner rib 41j, the outer rib 41k, the pin holder rib 32d, the damper holder rib 42f, and talc is provided as a friction damping unit. However, even when only the inner rib 41j, for example, is used as the friction damping unit, an effect of suppressing the generation of abnormal noise is achieved.

What is claimed is:

1. A steering wheel including:
a support member which is inserted into a bag holder of an airbag device;
a slider which has a cylindrical shape, covers the support member, and is slidable in a front-rear direction;

a damper holder which has an annular shape and covers at least a part of a region around the slider;
an elastic member which has an annular shape and is interposed between the slider and the damper holder, in which the airbag device functions as a damper mass of a dynamic damper and the elastic member functions as a spring of the dynamic damper; and
a friction damping unit including:
a part provided in a portion between the slider and the elastic member; and
a part provided in a portion between the damper holder and the elastic member,
wherein the friction damping unit includes talc, and
wherein the friction damping unit includes ribs, which extend in a front-rear direction and are provided on an outer diameter side of the slider and an inner diameter side of the damper holder.

2. A steering wheel including:
a support member which is inserted into a bag holder of an airbag device;
a slider which has a cylindrical shape and covers the support member to be slidable in a front-rear direction;
a damper holder which has an annular shape and covers at least a part of a region around the slider;
an elastic member which has an annular shape and is interposed between the slider and the damper holder, in which the airbag device functions as a damper mass of a dynamic damper and the elastic member functions as a spring of the dynamic damper; and
a friction damping unit including: a part provided in a portion between the slider and the elastic member; and a part provided in a portion between the damper holder and the elastic member, wherein
the friction damping unit includes:
ribs which extend in a front-rear direction and are provided on an outer diameter side of the slider and on a portion between a rear end of a tubular portion of the slider and a receiving portion of the slider; and
ribs which extend in the front-rear direction and are provided on an inner diameter side of the damper holder.

3. The steering wheel according to claim 2, wherein the elastic member includes:
a tapered surface;
an elastic plate-shaped portion;
an annular protrusion portion; and
a front-end surface; and
the friction damping unit includes:
inner ribs which extend in a circumferential direction and are provided on an inner diameter side and on a portion between a front end of the tapered surface and a front end of the elastic plate-shaped portion; and
outer ribs which extend in the circumferential direction and are provided on an outer diameter side and on a portion between a front end of the annular protrusion portion and the front-end surface.

* * * * *